United States Patent
Munson, Jr. et al.

(10) Patent No.: US 9,410,503 B2
(45) Date of Patent: Aug. 9, 2016

(54) PACKAGED PROPELLANT AIR-INDUCED VARIABLE THRUST ROCKET ENGINE

(75) Inventors: David Murray Munson, Jr., Dallas, TX (US); Nicholas Collier, Smithville, TX (US)

(73) Assignee: Innovative Defense, LLC, Smithville, TX (US)

(*) Notice: Subject to any disclaimer, the term of this patent is extended or adjusted under 35 U.S.C. 154(b) by 455 days.

(21) Appl. No.: 13/261,409

(22) PCT Filed: Feb. 23, 2011

(86) PCT No.: PCT/US2011/025949
§ 371 (c)(1),
(2), (4) Date: Aug. 22, 2012

(87) PCT Pub. No.: WO2011/106446
PCT Pub. Date: Sep. 1, 2011

(65) Prior Publication Data
US 2013/0014487 A1    Jan. 17, 2013

Related U.S. Application Data

(60) Provisional application No. 61/338,816, filed on Feb. 24, 2010.

(51) Int. Cl.
*F02K 9/62* (2006.01)

(52) U.S. Cl.
CPC ........................ *F02K 9/62* (2013.01)

(58) Field of Classification Search
CPC .............. F02K 9/52; F02K 9/58; F02K 9/62; F02K 9/64; F02K 9/82; F02K 9/97; F02K 9/98; F02K 7/10; F05D 2240/128; F05D 2240/1281; Y02T 70/56; C06B 47/08; C01B 13/0214; C06D 5/08

USPC .......... 60/200.1, 204, 19, 251, 253, 254, 256, 60/39.281, 39.828; 102/374, 376, 380
See application file for complete search history.

(56) References Cited

U.S. PATENT DOCUMENTS 3,257,799 A * 6/1966 Goalwin .......................... 60/211
3,357,191 A   12/1967 Berner
(Continued)

OTHER PUBLICATIONS

International Searching Authority: International Search Report dated Apr. 28, 2011.
International Searching Authority: Written Opinion of the International Searching Authority dated Apr. 28, 2011.

*Primary Examiner* — Ehud Gartenberg
*Assistant Examiner* — Jared W Pike
(74) *Attorney, Agent, or Firm* — Hemingway & Hansen, LLP; D. Scott Hemingway

(57) ABSTRACT

This invention is a packaged propellant air-induced variable thrust rocket engine that has a vast number of uses and applications for this invention. The primary purpose of the device described here is to provide a light weight, torque and vibration free thrust generator for the propulsion of aircraft. This device will facilitate the fabrication of very light weight aircraft because of the lack these forces. This device can also be used anywhere high velocity air flow and or the resulting thrust is needed. The invention uses aerodynamic principles to compress and accelerate the incoming air, prior to it being heated and accelerated by a short duration burst of thermal and kinetic energy from discrete packets of a mixture of oxidizable fuels. The heated and accelerated air then expands as it travels thru the device providing thrust.

14 Claims, 5 Drawing Sheets

(56) References Cited

U.S. PATENT DOCUMENTS

| | | | |
|---|---|---|---|
| 4,372,213 A * | 2/1983 | Rozner et al. | 102/301 |
| 4,901,526 A | 2/1990 | Barth et al. | |
| 5,282,359 A * | 2/1994 | Chester | 60/269 |
| 6,142,056 A * | 11/2000 | Taleyarkhan | 89/7 |
| 6,968,676 B1 * | 11/2005 | Krishnan | 60/250 |
| 6,983,587 B2 * | 1/2006 | Shumate | 60/204 |
| 7,278,611 B2 | 10/2007 | Eidelman | |
| 7,506,500 B1 | 3/2009 | Krishnan | |

\* cited by examiner

PACKAGED PROPELLANT AIR-INDUCED VARIABLE THRUST ROCKET ENGINE

RELATED APPLICATION DATA

This application is related to Provisional Patent Application Ser. No. 61/338,816 filed on Feb. 24, 2010, and priority is claimed for this earlier filing under 35 U.S.C. §119(e). The Provisional Patent Application is also incorporated by reference into this patent application.

TECHNICAL FIELD OF THE INVENTION

The present invention relates to air-induced variable thrust rocket engines.

BACKGROUND AND PRIOR ART OF THE INVENTION

Although the Wright Brothers are credited with the first powered flight, even ancient man's dreams and ambitions have shown a fascination with the thought of leaving the ground and defying gravity. Logic would dictate the idea of flight was there in ancient times, I would think from observation of birds. What was missing for ancient man was a source of propulsion and materials strong and light enough. The idea of air passing over a flat surface, edge on, would also have been obvious from the observation of birds, leaves, and the wind raising heavy flat objects off the ground.

From the time of Leonardo da Vinci, man's paradigm of a flying machine involved powered rotation of masses, such as a shaft with fan blades on the end for the purpose of moving and compressing air. Rotating masses create torques and stress loading that requires airframes to be robust and consequently heavier than one would like.

The common methods of aircraft and missile propulsion today are propellers, gas turbine (jet engines) rockets, ram and scram jets. Propeller driven aircraft use volatile liquid aviation fuel to power a reciprocating or gas turbine engine, which in turn drives a propeller, or rotors in the case of a helicopter. The propeller or rotor pulls sufficient air through its diameter to push the aircraft through the air at sufficient speed for the wings to provide lift or in the case of a helicopter, rotors to provide downward thrust for vertical lift. These conventional types of propulsion are heavy, noisy, complex, expensive, and subject to mechanical failure because of so many moving parts. Vibration and torque are also of major consideration in the design of aircraft because of the requirements for stronger and consequently heavier airframes to handle the stresses produced by these torque and vibration forces. Even the engines themselves require high precision parts and because of torque's and loads, strong and heavy metals are required in the structure.

In the case of the reciprocating engine, air and liquid fuel are inducted into a closed cylinder through a set of mechanical valves, in appropriate ratios. This mixture is compressed by a piston connected to a crankshaft. As the piston reaches the top of its stroke, a spark is generated, in the combustion chamber, above the piston, igniting the compressed fuel air mixture, forcing the piston down and turning a crank shaft. The crankshaft in this type of engine is connected to a gearbox through which the torque is taken from it, geared up or down and delivered to the propeller or rotor system. Gearboxes, shafts and other stressed members have to be made of hardened steel because of the torque loads placed on them, this adds to the weight problem. These type engines are plagued with drawbacks, from weight, vibration, icing problems, dust choking, thermal inefficiency, and cost of maintenance, which over the life of the aircraft is three to one, maintenance to flight hours.

Existing jet engines use their liquid fuel to heat and expand air through a heavy and costly precision turbine wheel. This turbine wheel rotates at 30,000 RPM and drives a shaft that is coincident with the longitudinal axis and extends to the intake of the engine. Very precise, expensive, and fragile multistage compressor blades are attached to this shaft and angled to provide air for the turbine wheel. These engines burn fuel continuously at an enormous rate, much of this fuel is wasted in heat and having to run continuously, because once started the ring of fire must be maintained to light off the incoming jet fuel. The whine of the turbine and the massive flow of partially burned JP5 makes a very loud noise and leaves a huge heat signature. Jet and turbine engines are also subject to flameout during power changes, so power changes have to be slow, another disadvantage of engines with rotating masses.

Jet and turbine engines, by their very nature, are very vulnerable to foreign object damage (FOD) because of, tight tolerances, fragile turbine blades, and the speed at which they rotate. Even very small objects can be a very serious problem if ingested into a jet engine, dust, volcano ash, birds and any kind of debris can be ingested during landing and takeoff off aircraft. This is especially true in combat zones or hastily prepared airfields, small objects ingested can cause serious damage, failure, or even explosion. The weight and forces caused by the rotating masses in jet and turbine engines requires the aircraft to be sturdy and consequently heavy and rigid. The cost of manufacture and maintenance is another drawback to jet engines. The frontal area on these type engines causes profile drag on the aircraft and produces a large radar cross section.

Solid Fuel Rockets

Conventional rockets are essentially a tube with a precise and concentric restriction known a De Laval nozzle or Venturi. This tube or rocket motor is filled with a volatile energetic fuel that burns on the edge of detonation. Rockets must carry the total mass of fuel and oxidizer on board. Once fired there is no shutoff. The fuel is often toxic and dangerous to handle and to manufacture. These engines are also very complex and expensive to build. They also require exotic materials and tight tolerances in their construction.

Leaks in rockets have serious consequences as seen with the Challenger explosion. Solid fuel rockets are essentially a large stick of explosive that burns at a controlled rate just below detonation. Any changes in the mixture such as air entering could cause detonation of the rocket motor. Detonation occurs when the burn velocity exceeds the sonic velocity of that material. Carrying an oxidizer for a solid fuel rocket on board when one is traveling through an oxygen rich atmosphere can be very dangerous. These types of rockets are very noisy and must have an area clear of personnel when launched.

Liquid Fuel Rockets

Robert H Goddard is credited with the first launch of a liquid fueled rocket in 1926. Pedro Paulet, a Peruvian, also claimed he had conducted experiments on liquid rockets in the 19th century, while a student in Paris. Liquid fueled rockets carry the fuel and oxidizer in separate tanks and require pumps and delivery lines to combine the fuel and oxidizer in a combustion chamber. Liquid rockets are desirable because of their energy density to containment mass required such as tanks, pumps and injectors.

In the case of liquid rockets the fuel and oxidizer are delivered through tubing lines from containment tanks by conventional or turbo pumps to a combustion chamber. Some of these pumps mix the fuel and oxidizer by spinning it into a vortex and causing mixing by centrifugal forces. Other methods of mixing are converging nozzles that collide the ingredients in a tight stream causing them to atomize, making for a more easily ignited mixture and a more complete burn.

There are many drawbacks to liquid rockets, tanks, pumps, injectors, and delivery lines are subject to cryogenic temperatures which can contribute to collapse of the tanks due to vacuum created inside the tank when empty. This along with the potential for instability of the projectile due to motion of the liquid in the tanks and icing adding weight makes liquid rockets far from an ideal propulsion system. Pumps and injectors exposed to −253 deg C., the storage temperatures of oxygen and hydrogen, commonly used combinations of fuel and oxidizer, have to be heated by hot gas circulation systems, stealing power from the thrust and adding weight and complexity.

The ignition methods for liquid rockets are not completely safe. Hard starts are common and cause explosions which can propel debris many meters at high velocity creating deadly hazards to personnel and property. This condition is precipitated when the ignition system fails to ignite the fuel mixture at the correct time and intensity. The fuel mixture builds up in the combustion chamber, when the igniter finally lights there is an explosion. Depending on how rich the fuel mixture and the blast pressure rating of the housing, this explosion can throw fragments many meters at high velocity. Such explosions can rupture the tanks and lead to the potential of a fuel air explosion.

The most used method of ignition involves flame, such as from a sparkplug, hot bridge wires, and many other similar means are also used. These engines can be throttled unlike solid fuel rockets. Although mono propellants are mostly used because of complexity and the hazardous nature of the ingredients. The volatility of some possible mixes make the necessity of a reliable ignition source paramount, many other mixes of propellants are possible with a reliable and sustainable ignition source.

Scram and ram jets are another type of propulsion system with their own set of problems. These types of engines cannot operate at zero airspeed and need to be taken aloft or have another power source and propelled to about 350 mph before there is enough air flow to prevent back pressure when the fuel is applied. Ram jets slow the air and compress it to subsonic velocity before combustion, whereas Scram jets operate at supersonic air flow throughout their operational range. There are many high tech problems with this type of engine such as the burn time of the fuel, if too slow it gets swept away before full combustion. Another severe problem that there does not seem to be a solution for at present, are supersonic shock waves which interrupt the smooth flow of air, disturb the fuel distribution and create temperatures beyond control. Because of this temperature problem supersonic powered flight time must be limited.

SUMMARY OF THE INVENTION

This invention is a packaged propellant air induced variable thrust rocket engine that has a vast number of uses and applications. The primary purpose of the device described here is to provide a light-weight, torque and vibration free, thrust generator for the propulsion of aircraft. This device will facilitate the fabrication of very light-weight aircraft because of the lack these forces. This device can also be used anywhere high velocity air flow and/or the resulting thrust is needed.

The invention uses aerodynamic principles to compress and accelerate the incoming air, prior to it being heated and accelerated by a short duration burst of thermal and kinetic energy from discrete packets of a mixture of oxidizable fuels. The heated and accelerated air then expands as it travels thru the device providing thrust. The ability to initiate an intermittent burst of energy is at the core of this invention. This is made possible by using nano-sized aluminum particles as either the sole fuel source or ignition source for other fuels in a small clear enclosure. The ability of nanometer-sized particles to be ignited by high intensity light thru clear plastic is a critical advantage. This effect is caused by the particles size being smaller than the wavelengths of light.

Light energy is absorbed but can not be radiated back out of the particle, causing very rapid heating of the particle beyond its melting point. When the particle melts, its oxidized outer surface cracks open and exposes unoxidized aluminum. Aluminum's strong affinity for oxygen whether in compounds such as water or in air causes immediate oxidation and heat generation. While aluminum offers the highest energy levels, other nanometer sized metals offer similar characteristics.

While the nanometer sized aluminum particles offer excellent heat release, their ability to initiate other fuels and or larger aluminum particles offers a lower cost source of heat for many applications. In these cases, its ability to be initiated remotely by a suitable level of light energy still provides its unique advantages. This invention initiates these packets so that the energy is directed solely in the desired direction of thrust in a pulsed fashion which allows maximum heat transfer to the incoming air without the need of a backflow preventing mechanical compressor.

The fuel package is ignited in a position and manner that allows airflow to be attained without the aid of fans, propellers, compressors or forward airspeed. This invention makes use of packaged fuel pellets to power an air-breathing engine. These energetic packets are encased in water and contained in a translucent outer casing. The contents of the packets include nanometer sized aluminum particles, a source of oxygen and optionally other oxidizable materials. The fuel packages are ignited by photonic energy from a high intensity triggered light source such as a strobe or laser, or by other means, acting on these aluminum particles, in the combustion chamber.

This combustion produces significant heat and hot steam discharge from the combustion chamber which increases the velocity of the air through a critically angled Venturi combustion flow area. Because the fuel is dispensed in packets and can be ignited on command, the engine will be capable of instant on off operation, pulsed in other words. Intermittent firing allows a more complete use of the heat energy of the fuel and a much cooler exhaust than a continuous combustion process. Also different fuel mixes can be used for cruise, than for max power, increasing efficiency.

IN THE FIGURES

DETAILED DESCRIPTION OF THE PREFERRED EMBODIMENTS

Figure 1:
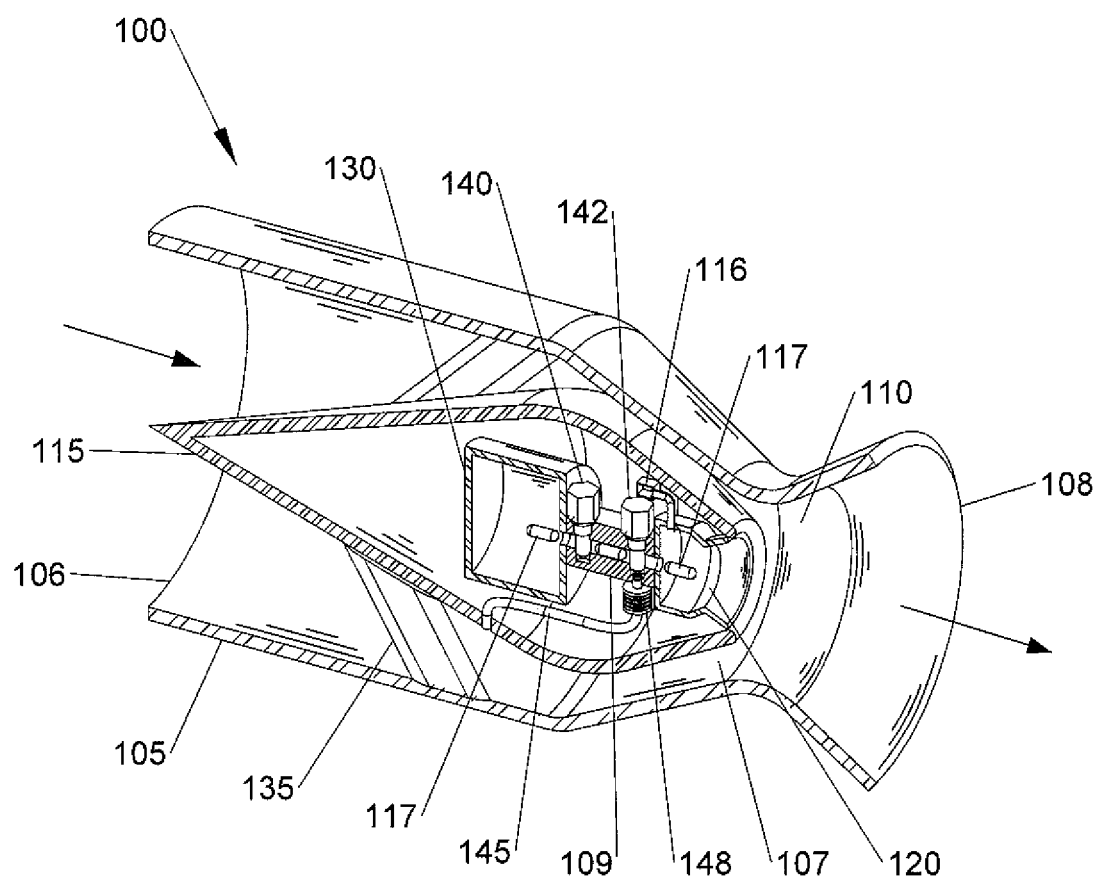
FIG. 1 is a prospective cut-away view of one embodiment in the invention.

FIG. 1 shown an air-induced rocket engine 100 using the teachings of the present invention. Air enters through front airflow inlet 106 and is divided by a central air divider 115 which supported in the airflow housing 105 by support struts 135. Located inside the central air divider 115 is an Energetic Fuel Packet (EFP) 117 storage compartment 130. This storage compartment can be replaced or supplemented by a separate storage area located outside the housing 105 with a connecting delivery tube not shown.

When thrust is needed, a backflow prevention valve 140 opens and an EFP 117 is injected through the air/fuel delivery manifold 109 into the combustion chamber 120. Photonic energy from a strobe light 116 or other means ignites the nano-aluminum particles contained in the water and the EFP 117, while in the combustion chamber 120. Very high temperature is created by the nano-energetic particles that convert the surrounding water to superheated steam, and also igniting other combustibles in the EFP 117.

A percentage of hydrogen peroxide can be included in the EFP 117 to provide more oxygen for oxidation. The water also prevents the temperature from rising to a level that would require refractory materials in the combustion chamber 120. Having a short duration burn with a controlled temperature rise transfers more of the thermal energy into the accelerating the air flow, instead of waste heating the walls of combustion chamber 120. This produced high temperature steam expands directionally from the combustion chamber 120 at high velocity into the Venturi combustion flow area 110.

This causes the air in the Venturi combustion flow area 110 of the airflow housing 105, to increase in temperature, drop in density and flow aft through the Venturi combustion flow area 110. The aft flow is caused by the velocity of the steam and heated air mix. After the pressure impulse has dissipated, air flush valve 142 allows air to flow thru air inlet passage 145 from the higher pressure region on the divider 115 into the air/fuel delivery manifold 109 and the attached combustion chamber 120 transferring residual heat to the Venturi combustion flow area 110 and providing fresh air for the next EFP 117 ignition.

The higher density and pressure of the colder incoming air fills the low pressure volume created by the high velocity movement of the mixture through the Venturi combustion flow area 110. Since the expanding steam has a slightly lower density than the air, as it expands into the Venturi combustion flow area 110 it gives up heat to the air in the path thusly increasing the enthalpy of air. In this process the relative humidity of the air rises as heating occurs creating a higher enthalpy and less dense air steam mixture which must expand as its density drops creating more velocity. This method of heat transfer is more effective than the heating and drying of air in a traditional turbine.

The humidified air steam mixture has a lower exit temperature while it expands and moves aft out rear exhaust 108, it is then replaced by colder more dense incoming air entering the annulus flow area 107. After all available heat is transferred another EFP 117 moves from the storage area 130 into the combustion chamber 120 and the cycle continues. The rapidity with which the EFPs 117 are dispensed and ignited determines the air velocity, mass flow rate and thrust of the device.

The directionality and design of the combustion chamber 120 and its location relative to the Venturi combustion flow area 110, prevents the high pressure thermal steam front from creating backpressure in the annulus flow area 107, even at zero velocity of the incoming air. The rapidly moving air steam mixture causes a pressure drop across the annulus flow area 107, due to its velocity and low density. This drop in pressure causes air to flow in the air housing 105, from front inlet 106 to rear exhaust 108 through the Venturi combustion flow area 110.

The velocity of the air is a function of the temperature and speed off the expanding thermal front from the input of energy of the EFP 117 in the combustion chamber 120. These velocities could be 2 k/s or greater providing sufficient thrust for vertical or horizontal flight. The humidified and heated air travels thru Venturi combustion flow area 110 and expands rearward thru the rear expanding nozzle 108 before exhausting the thruster.

In certain applications this device 100 or multiples of device 100 could be surrounded by an outer air housing through which air is drawn in, heated by the external heat of the thrusters and exhausted at higher velocity, giving extra thrust. This flow of cooler air can provide cooling to the thruster and reduces or eliminates the heat signature. It is a design intention to avoid high combustion and gas temperatures inside the engine to allow lightweight materials to be used. This is facilitated by using direct fuel to water contact which produces steam as well as other exhaust components to transfer the fuel energy to the air flowing thru the thruster.

The EFPs 117, can have various amounts of energetic nano-aluminum and other fuels, to further allow the device to provide variable thrust on demand. This type of engine would be most desirable in a combat situation because its lack of continuous heat signature and sound, which can be dampened or eliminated. At cruise power levels, the intermittent operation allows the exhaust to be close to atmospheric conditions. This thruster has no rotating masses as a consequence it can sustain many penetrations from small arms or bomb fragments and still operate.

In a vertical takeoff situation, where very high thrust power is needed, the temperature control offered by the water allows the needed levels of fuel to be added with sufficient water and flashed to steam providing more thrust which draws additional air through the Air Housing 105, providing extra lift. There are no moving parts in air stream of this thruster just the mechanisms delivering the EFPs 117. Using nanometer-sized aluminum to initiate combustion of other fuels offers many advantages over other means of using liquid fuels.

These packets can be ignited with high intensity light or other non contact means. Nano-aluminum has 46% more energy than liquid fuels such as gasoline and is only one third the volume by weight. Dispensing fuel in packaged form allows for pulsed operation in this device. In a combat zone this would allow an aircraft to quietly swoop on an enemy unheard in a glide mode and have the ability to add power only when needed. Additionally by design the sonic energy assists the acceleration of the exhaust air and is focused behind the aircraft along the axis of travel, so little sound is projected ahead of the aircraft.

Produced sound is intermittent as well and at a low frequency compared to modern aircraft engines with noise signature audible for tens of miles. All of the materials in the fuel packets contain energy which will be consumed in the combustion process and that energy extracted leaving no visible or thermal signature. Nano Al packages can be used as an ignition source in combination with conventional fuels to power this or other devices. The timing between initiations needs to be long enough for all of the heat of the prior combustion to be used and the airflow into Venturi combustion flow area 110 have time to establish a stable air pressure.

In this way, all of the energy is used to propel the air backward and not on pulling in air to annulus flow area 107 as would happen in a continuous burn condition where the inlet pressure at Venturi combustion flow area 110 drops. Ideally the thruster is sized to be able to operate most efficiently except at max power intervals such as takeoff or maneuver.

During these high power periods this design is capable of very high thrust outputs due to the design of combustion chamber 120. An optional air compressor 148 can be added to boost air flow in air tube 145 in applications where the interval between firings is insufficient to allow unassisted replenishment of air in combustion chamber 120.

This device can also be used wherever high speed air flow is needed. This is not limited to but could include blowing out fires, clearing runways, excavating earth, drying up mud or water, finding buried objects, crowd control, takeoff booster engines and others. This device could be used on a remote operated vehicle for blowing away loose dirt and uncovering land mines and other objects. This device could be used outside the atmosphere if it were fitted with shutters on the intake and steam used as the mass exchange fluid. Very little water would be required in the vacuum of space, even the waste water from the occupants of the spacecraft could be used. This particular spike design has more rapid acceleration of air than the free flow design shown in FIG. 2 but has a lower max thrust.

Figure 2:
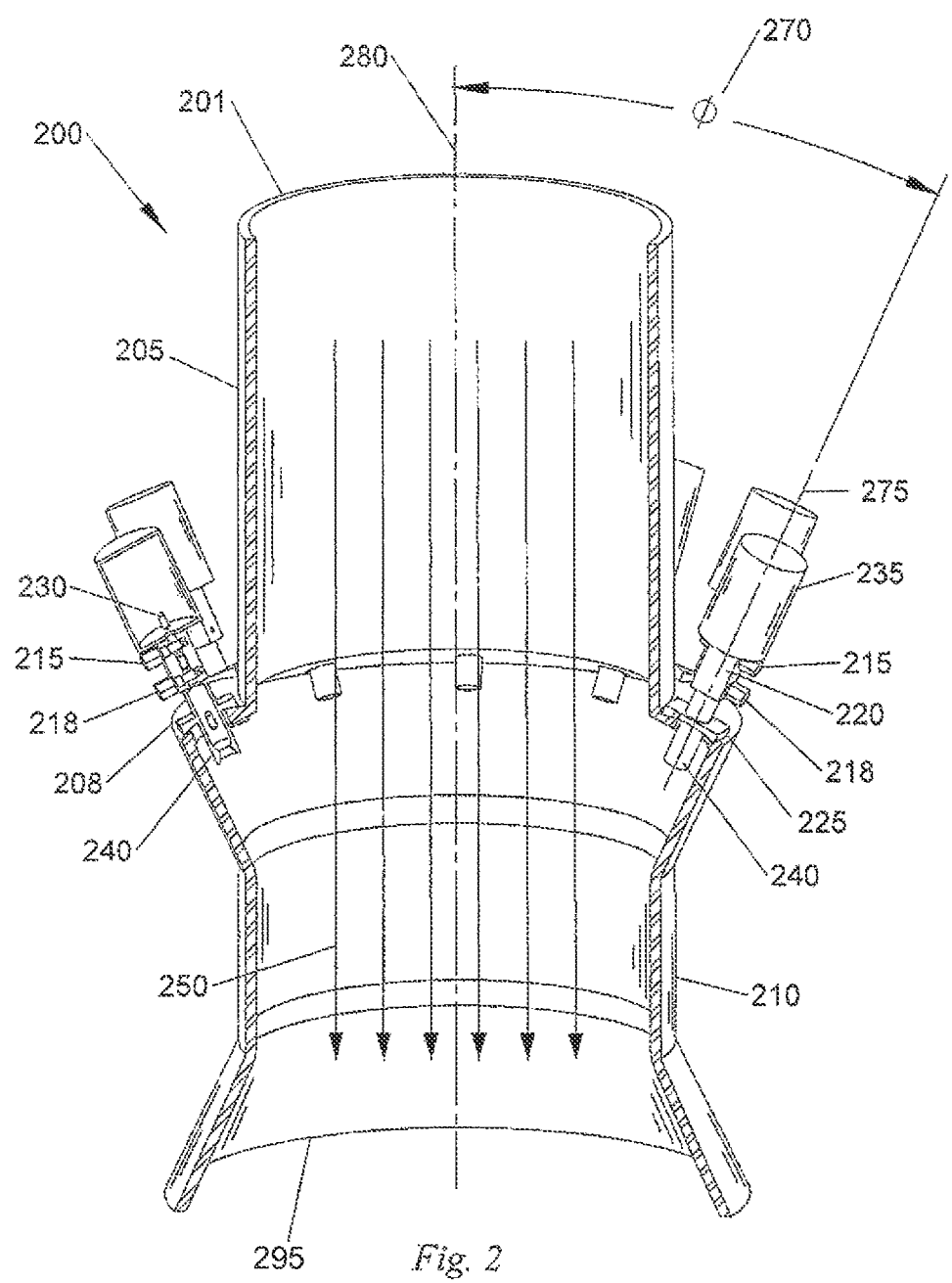
FIGS. 2, 2A and 2B are prospective cut-away views of a second embodiment of the present invention.

FIG. 2 is a high air flow modified rocket with Venturi combustion flow area device 200, which offers easy flow during non heating periods for more efficient heat transfer as the air enters at entrance 201 of main flow air housing 205 and travels without constriction through the device past a cluster of combustion chambers 240 arrayed around the combustor mounting ring 208. These combustion chambers 240 are supplied with Energetic Fuel Packets (EFP) 230 that are stored in dispenser 235 and travel through a delivery air/fuel delivery manifold 220 which is equipped with a back flow prevention valve 215 to prevent hot gases and bright light from traveling back up the delivery air/fuel delivery manifold 220 to dispenser 235.

During periods of non-combustion, an air flush valve 218 is open to allow air flow into the combustion chamber 240 to remove heat and provide air for the next combustion. Depending on the power requirements this air may be from air flow in the outer casing or provided by a pressurized air source. The combustor assembly is equipped to swivel on slide 225 to alter the angle 270 of the combustion chamber axis 275 relative to the housing axis 280. At initial startup and during low speed operation the combustion chambers 240 are at a minimum angle for initial startup while the air coming thru inlet 201 has little or no velocity. During periods of no combustion, air flowing through the main flow air housing 205 at Venturi combustion flow area section 210 is mostly undisturbed and maintains laminar flow depicted by the unbent stream lines 250 until exiting the tube at 295.

Figure 2A:
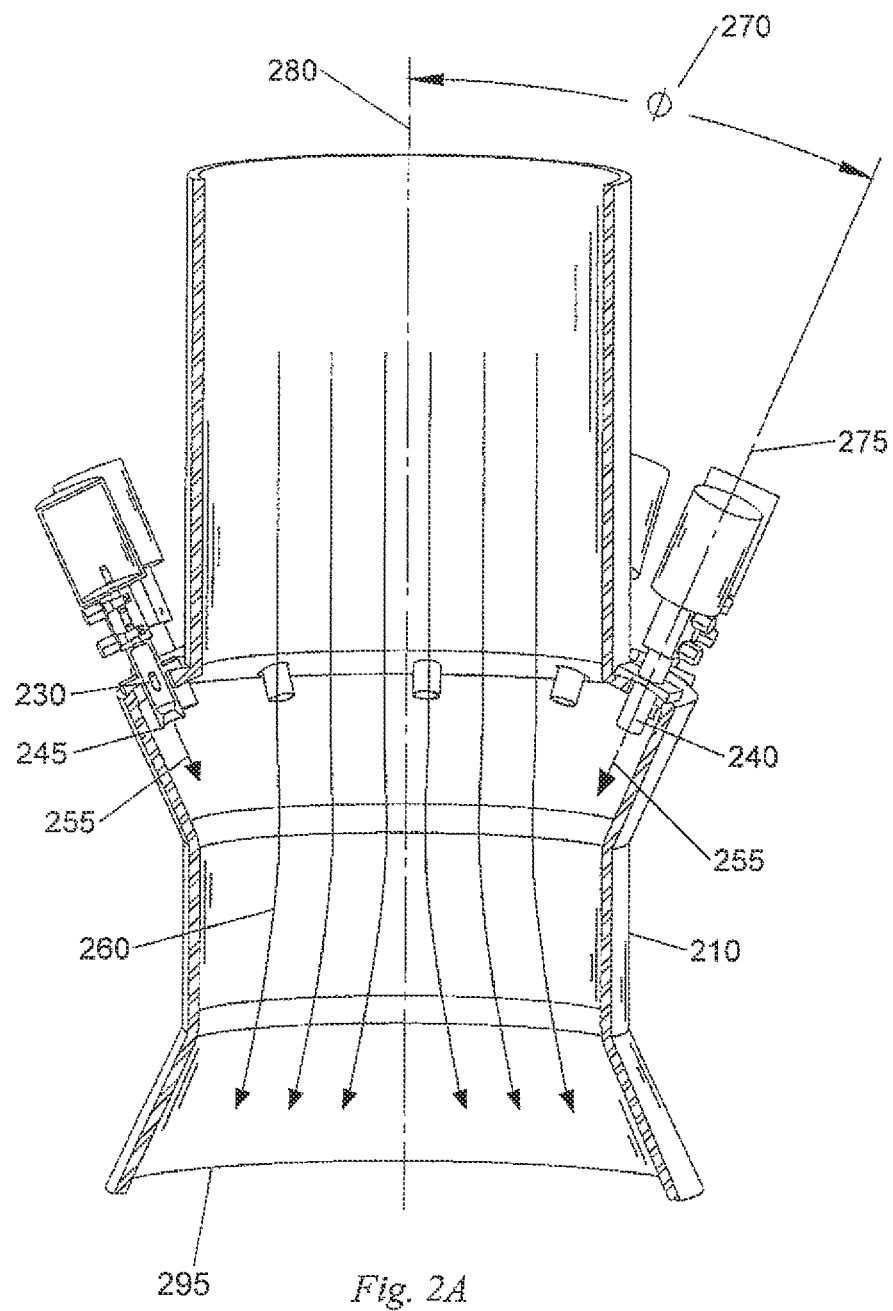

In FIG. 2A, the combustion chambers 240 are shown firing at a minimum angle $\phi$ 270 for startup or low speed operation. During startup the air inside Venturi combustion flow area section 210 is not moving, the angle $\phi$ 270 of combustion chamber 240 ensures that there is not unproductive backflow. When combustion of an energetic fuel packet 230 has initiated, combustion chamber 240 creates a pressurized flow out of the exhaust port 245 along the trajectory shown by arrow 255.

This burning heated exhaust deflects and heats the air inside the Venturi combustion flow area section 210, simulating a narrower orifice, shown by the slightly bent streamlines 260. The fuel burning in the combustion chamber 240 also produces superheated steam to propel the heated and possibly still burning mixture along the desired trajectory in Venturi combustion flow area section 210. The pressure and flow created by the superheated steam eliminates the need for high pressure injection pumps and supporting power units.

Thrust from this device is obtained by introducing the thermal energy of the energetic fuel packet 230 as a pressurized thermal wave. These thermal waves, emanating from individual combustion chambers 240, arranged around the perimeter of a air housing 205, converge at the center of Venturi combustion flow area section 210 of the main flow air housing 205 creating a virtual Venturi system. As these flow streams 260 converge, a Mach Stem is formed accelerating the converged front up to 6 times its input velocity, depending on the convergence angle.

Figure 2B:
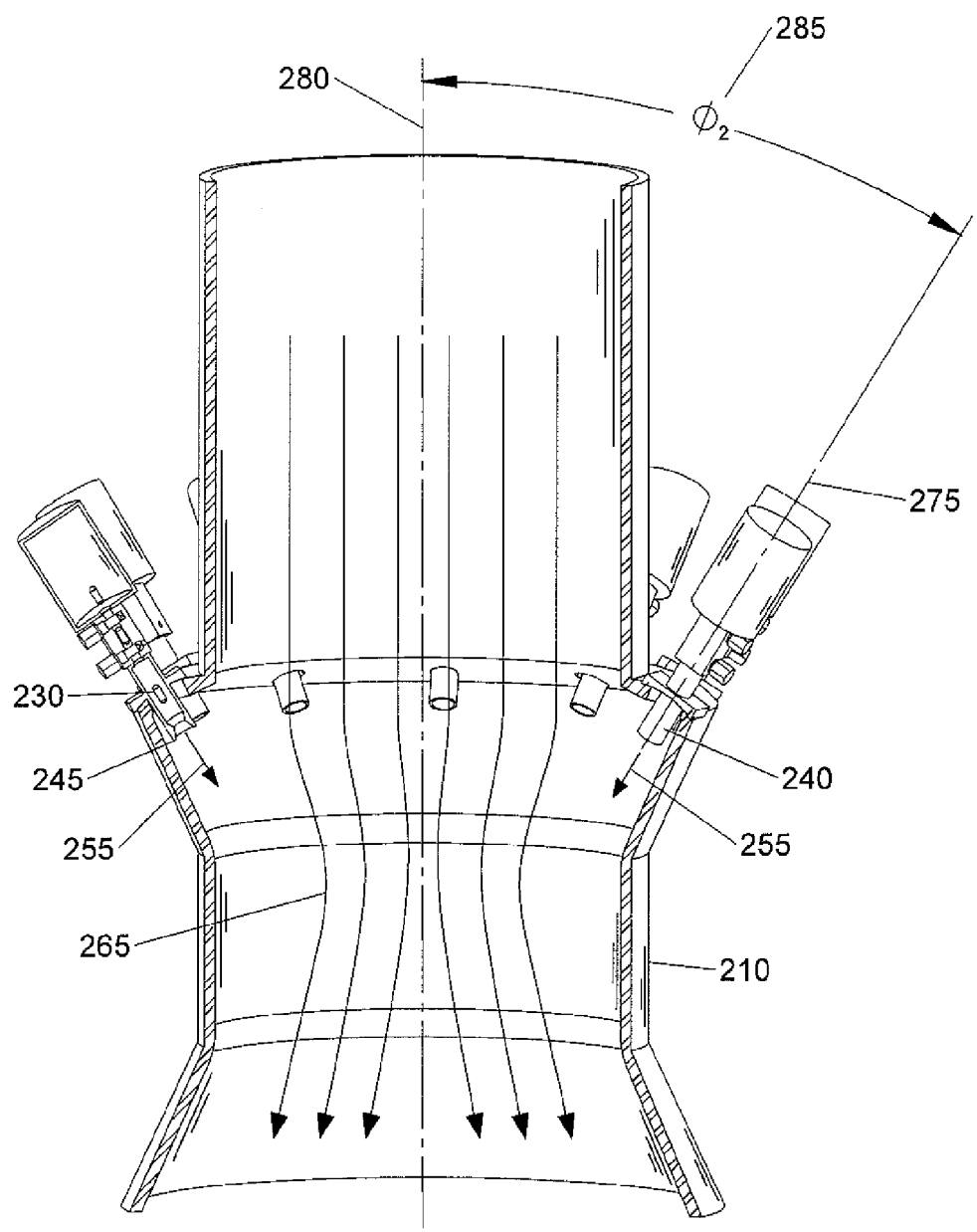

In FIG. 2B, the combustion chambers 240 of the modified rocket engine is shown having at a greater angle $\phi_2$ 285 than angle 270 in FIG. 2A to the air housing axis 280. This greater angle $\phi_2$ 285 is needed during high velocity air flow to create the virtual Venturi combustion flow area reduction. As shown in FIG. 2A combustion of a energetic fuel packet 230 that has initiated in combustion chamber 240 creating pressurized flow out of the exhaust port 245 along the trajectory shown by arrow 255.

This burning heated exhaust deflects and heats the air inside the Venturi combustion flow area section 210, simulating a narrower orifice, shown by the bent streamlines 265. Since the fuel is initially burned in the combustion chamber 240 prior to being introduced into the air stream in Venturi combustion flow area 210. The greater the angle 285 the faster the Mach Stem, this offers an advantage at higher airspeeds by allowing the thermal wave to be introduced at a less oblique angle to the axis of flow depicted by arrow 255. This would facilitate a more concentrated impulse and a more rapid acceleration of the air mass.

The rapidly increased flow is achieved because the convergence angle of the thermal front is more acute, thusly causing the cone shaped air mass formed by the front, to achieve a higher velocity. There are a range of advantageous angles 285 possible that are dependent on air flow velocity, a greater combustion chamber 240 angle 285 is possible with higher air velocity moving through Venturi combustion flow area 210.

By introducing the energy from the energetic fuel packet 230 in this manner a greater amount of heat energy or enthalpy is added to the incoming air. The circumferentially converging thermal front provides a much greater area of contact with the air than fuel ignited in the moving air stream and is far more efficient. Since the incoming air is directed inward and away from the wall of the air housing 205 there is less thermal stress on the air housing 205.

These waves could move at 2 k/s or greater depending on the fuel or combinations of fuels used. The direction of this thermal wave is controlled by increasing or decreasing angle 285. The combustion chambers 240 axis 275 could be adjustable to take advantage of the Mach Stem increase in velocity at higher airspeeds while serving as a means of eliminating the possibility of backpressure at low or zero air inlet velocity. This ability and the fact that the fuel in this application is initially burned in the combustion chamber 240 and not in the airflow area 210 is what allows time for the fuel to complete a stoichiometric burn before being carried away by the air housing 205 air stream. Fuel processed this way insures that all energy will be extracted from the fuel packet for the purpose of moving air rather than wasted in the exhaust heat.

Mixtures of fuels can be used in this device such as Methane, Propane, Kerosene or JP5 and many others. The ability to initiate a burn front in Nano sized aluminum (nano-Al) agglomerations by photonic means makes this possible. Since the nano-Al fuel packets are delivered incrementally this air moving device has instant on and off operation capability. Another great advantage of this invention is its lack of moving, parts, as a result of this there are no torque or vibration stresses produced during operation. This facilitates lighter airframes and consequently all parts of the aircraft can be of a much lighter construction.

Figure 3:
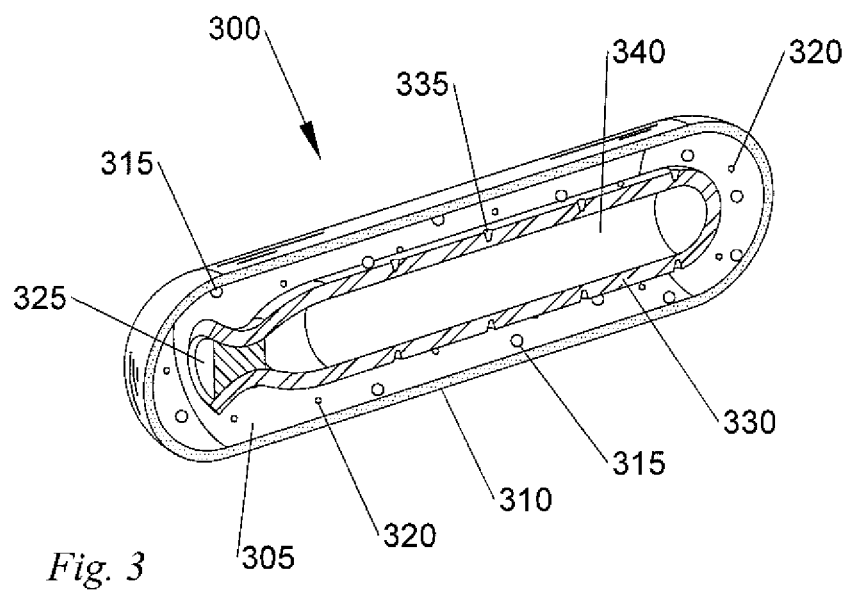
FIG. 3 is a lengthwise cut-away figure of the energetic fuel packet used in the present invention; and, FIG. 3A is a widthwise cut-away figure of the energetic fuel packet used in the present invention.

FIG. 3 is a cognitional cutaway prospective view of an exemplary energetic fuel packet. The clear outer casing 310 holds the mixture 305 of nano-Al particles 320 in a water or water hydrogen peroxide slurry mixture 305. Suspended in the mixture 305 can be additional fuels such as larger aluminum particles 315, and other fuels. A thin filmed sealed aluminum capsule 330 can be used that may have nano-Al initiators 335 along its length, to ignite it and the hydrocarbon and oxygen mixture 340 that is contained inside. One end of the aluminum capsule 330 can have a combustible plug 325 that has a dual purpose to seal the opening and facilitate the filling of capsule 330 with mixture 340. The combustible plug 325 can be designed to burn more quickly than the initiators 335 or instead of them in applications where it is desired to have capsule 330 move out of the initial combustion area before it is completely oxidized.

Figure 3A:
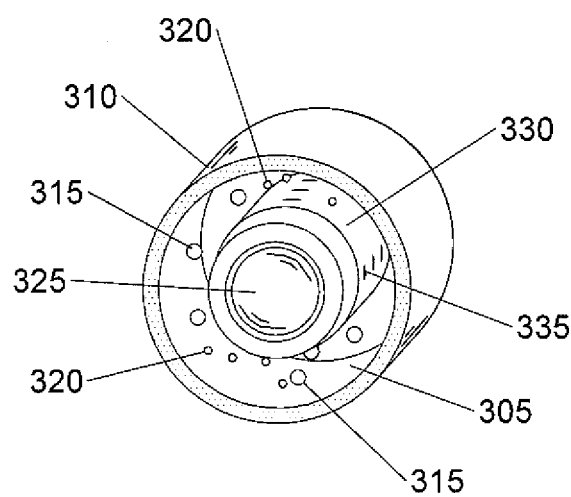

FIG. 3A shows a radical cutaway prospective view of the energetic fuel packet. These waves could move at 2 k/s or greater depending on the fuel or combinations of fuels used. The direction of this thermal wave is controlled by increasing or decreasing angle 285. The combustion chambers 240 axis 275 could be adjustable to take advantage of the Mach Stem increase in velocity at higher airspeeds while serving as a means of eliminating the possibility of backpressure at low or zero air inlet velocity. This ability and the fact that the fuel in this application is initially burned in the combustion chamber 240 and not in the airflow area 210 is what allows time for the fuel to complete a stoichiometric burn before being carried away by the air housing 205 air stream.

Fuel processed this way insures that all energy will be extracted from the fuel packet for the purpose of moving air rather than wasted in the exhaust heat. Mixtures of fuels can be used in this device such as Methane, Propane, Kerosene or JP5 and many others. The ability to initiate a burn front in nano-sized aluminum (nano-Al) agglomerations by photonic means makes this possible. Since the nano-Al fuel packets are delivered incrementally this air moving device has instant on and off operation capability. Another great advantage of this invention is its lack of moving, parts, as a result of this there are no torque or vibration stresses produced during operation. This facilitates lighter airframes and consequently all parts of the aircraft can be of a much lighter construction.

Many different capsule 330 configurations can be used with different mixtures 340 and designs to meet usage goals. Capsules such as 330 offer a longer burn time in larger engines such as might be used in a lighter than air vessel, which operates at a low airspeed, or during high power operations. The use of different composition packets 300 to meet the needed power level allows very rapid thrust changes. It will be understood that this example energetic packet does not restrict the variations that are needed to fully implement the advantages of this fuel delivery system component of the invention.

Furthermore in some below freezing applications the use of frozen water and nano-Al as an outer casing may offer advantages in high altitude aircraft where packets may be fabricated as used with differing compositions. Likewise an outer casing 310 may have a similar design to capsule 330 with an oxidizable metallic shell.

Another advantage of these thrusters is they can be part of the structure of the aircraft providing further weight and cost savings, since they are inexpensive to build and can be recycled or discarded when no longer serviceable. The weight of this device is approximately 10% of a conventional gas turbine engine of the same diameter. That same reduction in weight could be expected throughout an air craft structure using this novel thrust producing concept because of the reduction of engine weight, and lower structure vibration and stress forces.

While this thruster can be used to power conventional aircraft designs, it offers great opportunity for innovative new aircraft designs that operate much more efficiently. Likewise it offers new capability in many other applications needing air movement or thrust. In the case of lighter than air vehicles, this type of thrust producing device is ideal because it can be operated in a selectable pulse mode and thrust is not required to provide lift for the craft. This device being capable of pulsed operation in an air buoyant craft allows such a craft to loiter quietly over a location for a very long duration using only sufficient fuel to maintain its position.

Besides its use for winged aircraft or rocket propulsion, the lack of weight and forces from torque and vibration make this an ideal propulsion system for lighter than air use. Lighter than air craft could be built around the cylindrical strength and rigidity of this engine and would have a very small frontal area. This would facilitate low drag and a negligible radar cross section, all of these attributes of this device make it a combat necessity. The structural integrity of a cylinder, which is the main structure of this device, makes this thruster an imminent candidate for a completely new family of large light weigh aero dynamic craft.

While a cylindrical shape offers many advantages other configurations are possible, even using many small combustors along the leading edge of an airfoil to accelerate and expand the air traveling underneath it, creating buoyancy. While the invention has been particularly shown and described with respect to preferred embodiments, it will be readily understood that minor changes in the details of the invention may be made without departing from the spirit of the invention.

Having described the invention, we claim:

1. A rocket motor comprising:
   a main airflow housing having an internal airflow space defined by internal walls of the main airflow housing, said main airflow housing having a front airflow inlet, said internal airflow space, and a rear airflow exhaust,
   a plurality of combustion chambers located adjacent and contiguous to the internal airflow space and releasing combustion exhaust into the internal airflow space, each one of said plurality of combustion chambers having a combustion chamber axis that has one or more oblique angles relative to a longitudinal axis of said main airflow housing;
   one or more dispensers coupled adjacent and contiguous to at least one of the plurality of combustion chambers, said one or more dispensers supplying energetic fuel packets to said at least one of said plurality of combustion chambers at said one or more oblique angles relative to the longitudinal axis of said main airflow housing;
   an adjustor slide associated with at least one of said plurality of combustion chambers to alter the oblique angle of said combustion chamber axis relative to the longitudinal axis of said internal airflow space, said adjustor slide placing the combustion chamber axis at a first angle relative to the longitudinal axis for start-up low speed operations and said adjustor slide placing the combustion chamber axis at a second angle that is greater than the first angle relative to the longitudinal axis for higher speed operations; and,
   said energetic fuel packet being combusted in close proximity to one or more of the plurality of the combustion chamber and in close proximity to the internal airflow space resulting in the expansion and acceleration of gases, said combustion of the energetic fuel packets including the conversion of an aqueous solution and nano-energetic particles in the energetic fuel packet, said expansion and acceleration of gases creating a positive airflow through the internal airflow space of the main airflow housing and thrust to the rocket motor.

2. A rocket motor according to claim 1 further comprising a backflow prevention valve located between dispenser and combustion chamber.

3. A rocket motor according to claim 2 further comprising a backflow prevention valve adjacent to the combustion chamber.

4. A rocket motor according to claim 1 wherein the combustion of the energetic fuel packets results in superheated steam.

5. The rocket motor according to claim 1 wherein the one or more dispenser can be replenished continuously.

6. The rocket motor according to claim 1 wherein the angle of the combustion chambers can be modified to alter the thrust of the rocket engine.

7. The rocket motor according to claim 1 wherein the energetic fuel packets are made with nano-aluminum particles.

8. A method of producing positive thrust to a rocket motor comprising the steps of:
providing a main airflow housing with a longitudinal axis that has an air inlet, an internal airflow space, and a rear exhaust;
providing a plurality of combustion chambers, each one of the plurality of combustion chambers being located adjacent and contiguous to the internal airflow space inside the main airflow housing and positioned to release combustion exhaust into the internal airflow space, each one of the plurality of combustion chambers having a combustion chamber axis that has one or more oblique angles relative to the longitudinal axis of said main airflow housing;
dispensing a plurality of energetic fuel packets from a dispenser located adjacent and contiguous with each one of the plurality of combustion chambers for ignition and combustion; and
adjusting with an adjustor slide coupled to each one of the plurality of combustion chambers to alter the oblique angle of each said combustion chamber axis relative to the longitudinal axis of said internal airflow space, said adjustor slide placing each combustion chamber axis at a first angle relative to the longitudinal axis for start-up low speed operations and said adjustor slide placing each combustion chamber axis at a second angle that is greater than the first angle relative to the longitudinal axis for higher speed operations; and,
combusting the energetic fuel packet in each of the plurality of combustion chambers to allow introduction of expanded gases in to the internal airflow space and thereby creating positive thrust to the rocket motor, wherein the combusted fuel results in accelerated air flow in the internal airflow space of the main airflow housing.

9. The method of claim 8 further comprising the step of:
restricting the backflow of air from the combustion chamber to the dispenser using a backflow prevention valve.

10. The method of claim 8 further comprising the step of:
using a manifold proximate to the dispenser to assist with the injection of energetic fuel packets into the combustion chamber.

11. The method of claim 10 wherein the manifold possesses an airflow inlet passage.

12. The method of claim 8 wherein the energetic fuel packets are made with nano-aluminum particles.

13. The method of claim 8 wherein the angle of the chamber can be altered to alter the thrust of the rocket engine.

14. The method of claim 8 wherein the combustion of the energetic fuel packets creates superheated steam.

\* \* \* \* \*